Nov. 30, 1971   D. HOFMANN   3,623,208
METHOD AND APPARATUS FOR AUTOMATIC BALANCING
OF MOTOR VEHICLE WHEELS
Filed Sept. 23, 1969   5 Sheets-Sheet 1

INVENTOR
DIONYS HOFMANN

BY Cushman, Darby & Cushman
ATTORNEYS

Nov. 30, 1971          D. HOFMANN           3,623,208
     METHOD AND APPARATUS FOR AUTOMATIC BALANCING
                 OF MOTOR VEHICLE WHEELS
Filed Sept. 23, 1969                    5 Sheets-Sheet 5
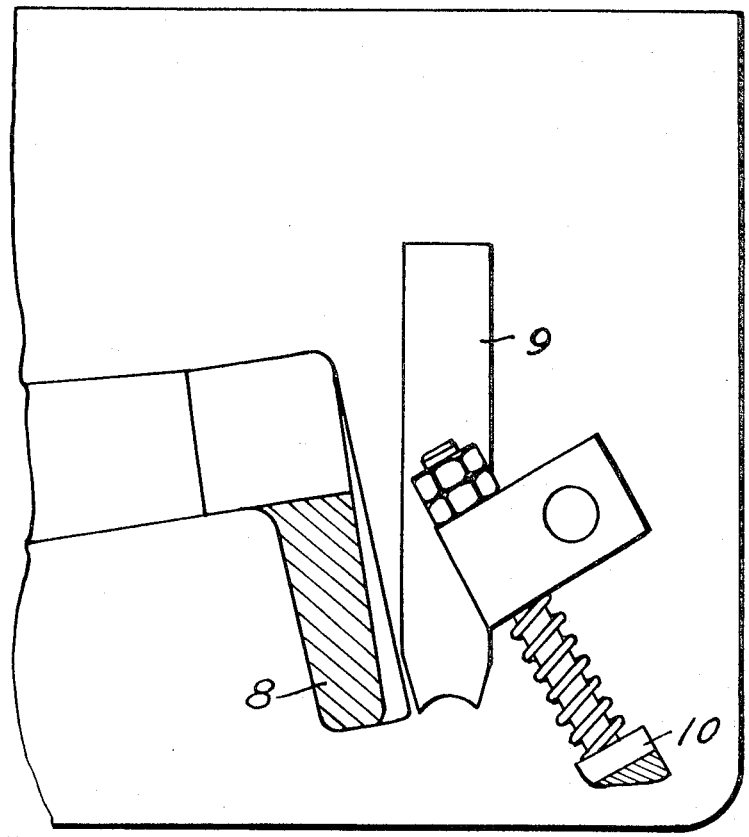
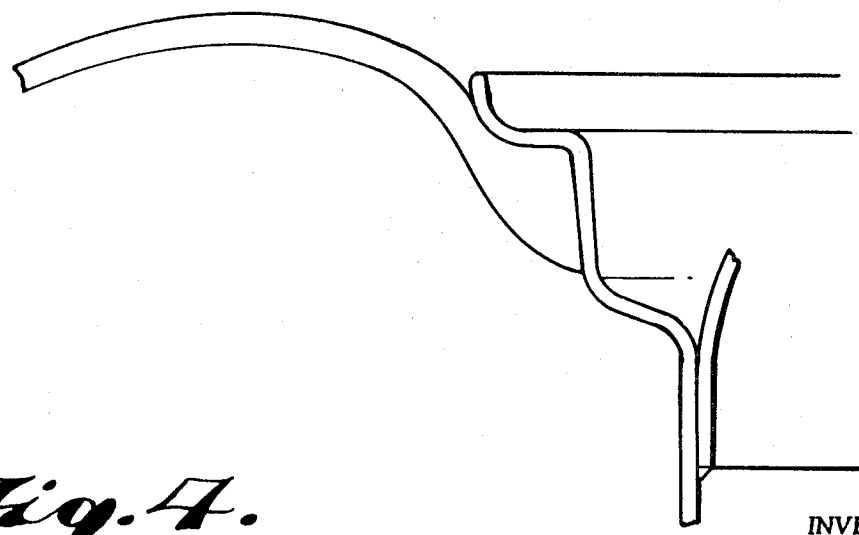
Fig. 4.
INVENTOR
DIONYS HOFMANN
BY Cushman, Darby & Cushman
                          ATTORNEYS

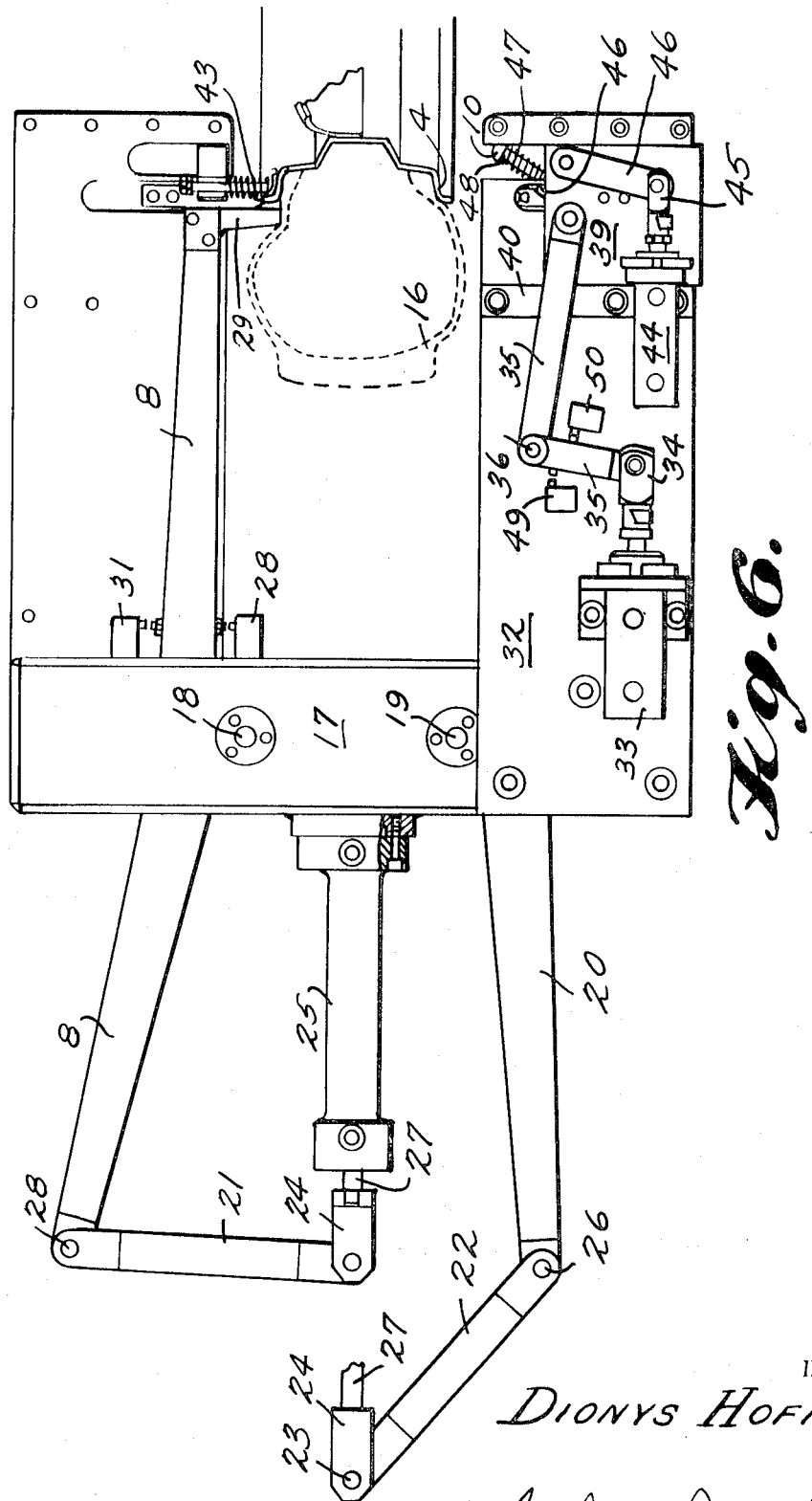

United States Patent Office 3,623,208
Patented Nov. 30, 1971

3,623,208
METHOD AND APPARATUS FOR AUTOMATIC BALANCING OF MOTOR VEHICLE WHEELS
Dionys Hofmann, Darmstadt-Marienhohe, Germany, assignor to Dionys Hofmann GmbH Maschinenfabrik, Onettmettingen, Wurttemburg, Germany
Continuation-in-part of application Ser. No. 800,882, Feb. 20, 1969. This application Sept. 23, 1969, Ser. No. 864,941
Int. Cl. B23q *17/00*
U.S. Cl. 29—407    2 Claims

ABSTRACT OF THE DISCLOSURE

While the vehicle wheel remains mounted on the device which has automatically determined the angular locations and amounts of the weights needed to balance the wheel at the two rim flanges, the tire beads are distorted away from the rim flanges at these locations and balance weight holding clips are installed so as to extend out over the respective rim flanges. Where tilting of the clips during installation may be a problem, a balance weight form simulating member is swung into place between the clip and rim flange until after the tire bead has been allowed to return and thus grip the clip between itself and the respective rim flange.

---

This is a continuation-in-part of my earlier copending application Ser. No. 800,882, filed Feb. 20, 1969, now abandoned.

FIELD OF THE INVENTION

The invention relates to a method for the automatic balancing of motor vehicle wheels in two correction planes where the tire bead is broken at the marked location of unbalance and a holding clip for a balance weight pushed onto the rim flange.

The invention relates further to a contrivance for carrying out this method.

BACKGROUND OF THE INVENTION

Usually, balance weights with separate holding clip are used in the automatic balancing of motor vehicle wheels. This mode of fastening provides over the balance weights with cast integral holding clip, so-called "hammer-in weights," a substantially higher safety against being thrown off while motoring. Owing to the separation of holding clip and balance weight, however, difficulties are experienced in the fitting of these two parts in an automatic balancing operation.

The German Pat. 1,084,494 describes a contrivance by which a balance weight and a holding clip are so applied to the rim flange of a motor vehicle wheel kept horizontal that one leg of the holding clip comes to lie between the tire and the rim flange while the other leg of the clip embraces the balance weight and presses it against the rim curvature. A clamp provided in connection therewith compresses the tire at a given point to facilitate the insertion of the holding clip. Suitable contrivances feed and secure then automatically in the same operation the balance weight and the holding clip. Here, the balance weight is inserted at a point which has been marked from hand in a previous working cycle in accordance with the results given by a measuring device. With this contrivance, the holding clip and the balance weight are fed from above. As it is becoming more and more practice of late to balance also motor vehicle wheels not in one but in two planes, the use of said contrivance in automatic balancing such as on a transfer line requires that the motor vehicle wheel be inverted to permit the application of the balance weights in the second plane. This means, however, another working cycle from which will ensue an appreciable increase in the price of the transfer line.

Basically, it is possible that the holding clip and the balance weight can be fed and inserted from below in the downward facing correction plane. However, as difficulties were experienced because of the unstable position of the holding clip which made the clip frequently tilt, the insertion of the clips from below was avoided until now.

SUMMARY OF THE INVENTION

The underlying object of the present invention is to propose an automatic balancing method for the balancing of motor vehicle wheels mounted in horizontal position and a contrivance for carrying out this method by which working cycles can be omitted. This problem is solved in that directly after determination of the unbalance, the location of the unbalances in the correction planes is successively turned to an insertion device, a holding clip is pushed onto the rim flange with a simulated balance weight as supporting element being pushed into at least the lower correction plane and being removed upon release of the tire, followed by the application of a balance weight of corresponding size. The device for inserting the holding clips used according to the invention is characterized in that each leg end of the clamp is associated with a clip holder and at least for the lower correction plane a hammer which can be swung into the holding clip in the plane of insertion. The hammer is preferably pressed on resiliently.

Experiences with the known clip inserting devices which do not perform simultaneously the fitting of the balance weight under the clip in the same operation, have shown that upon the release of the clip feeding device and the detachment of the tire compression clamp, the occurring flexing may cause the holding clip to take different positions which renders difficult the ulterior insertion of the balance weights. The suggested method does away with this shortcoming.

BRIEF DESCRIPTION OF THE DRAWINGS

The invention is more fully illustrated by the enclosed drawings in which

FIGS. 4 and 5 are additional enlarged representations from which can be noted the operation of the single component parts of the device in the inserting process;

FIG. 6 is a schematic elevation view of the automatic inserting device.

GENERAL DESCRIPTION

Figure 1:
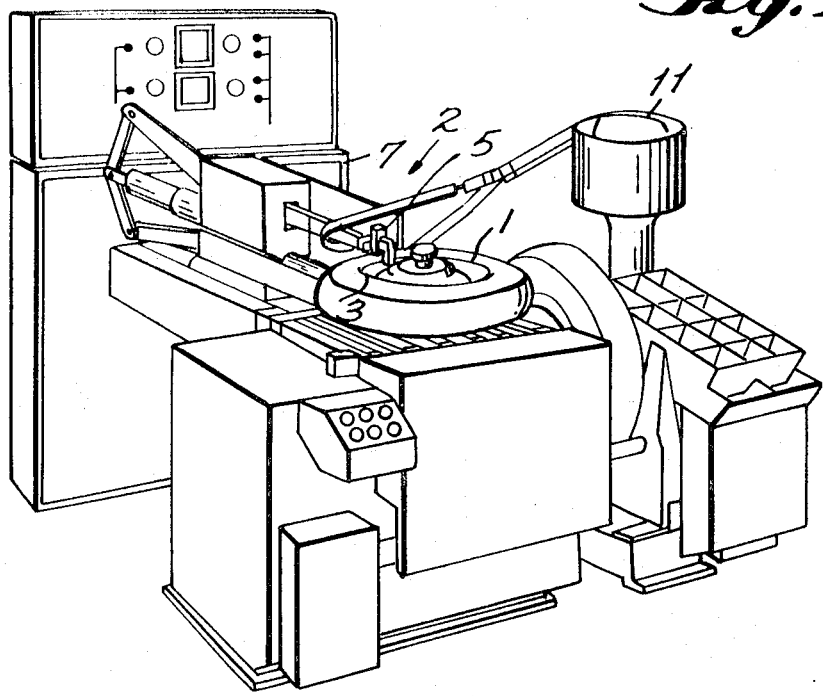
FIG. 1 is a general view of a known automatic balancing device.

A motor vehicle wheel 1 is mounted in horizontal position on a balancing installation commonly marked 2. The amount and angular location of the unbalance present in both sides of the motor vehicle wheel 1 are determined in known manner. The amount of unbalance is indicated on the instruments 14 and 15 of the measuring device 13 which is arranged on a control cubicle 12. While the instrument 14 registers the amount of unbalance in the upper wheel side, instrument 15 gives a reading of the amount of unbalance in the lower wheel side. However, the measured values of the amount of unbalance in both wheel sides are stored and the related angular locations as well. Subsequently to the stopping of the drive, the stored readings of the angular locations control a positioning device in that first the light point of the upper wheel side is turned to the inserting plane of an inserting device commonly marked 5. Such positioning devices are known and have been described in detail for example in the document 1,020,814 laid open to public inspection in Germany.

Following the positioning of the motor vehicle wheel 1, the tire is pushed off the rim near its two side walls and a holding clip is slipped over the rim flange edge in situ of the unbalance. Thereupon, the light point of the lower wheel side is turned to the inserting plane and upon pushing the tire off the rim near its two side walls, a second holding clip is applied at the location of the unbalance in the lower wheel side.

As soon as both clips are inserted, the wheel will be removed from the balancing installation 2 and tilted into a gap between the balancing installation 2 and the weight stock bin where the required balance weights are pushed under the holding clips. The size of the weights to be applied will be seen from the indication on the meters 14 and 15 of the measuring device 13.

DESCRIPTION AND FUNCTION OF AUTOMATIC INSERTING DEVICE

The inserting device consists in two assemblies operating independently from each other named tire compression device and clip inserting device. The tire compression device is made up of an upper compression lever 8 and a lower compression lever 20 which can be operated simultaneously by means of the piston and cylinder arrangement 25, 27. The levers are carried in the bearings 18, 19 and pivotally connected with the casing 17 which supports flanged thereto also the pneumatic cylinder 25. If the tire compression device is in its normal position or open (as shown in the lower half of FIG. 2), the piston 27 and therewith also the yoke 24 is in the left end position. The levers 8 and 20 which are directed by the lever 22 and 21, respectively, and are pivoted in the hinges 26 and 28, have the smallest possible distance to each other to effect that the two other arms of the levers 8 and 20 are spread apart sufficiently for an easy mounting of the tire 16.

By operating thereupon the piston and cylinder arrangement 25, 27, the right arms of the levers 8 and 20 move toward each other. The minimum distance between the front ends 29 and 30, respectively, of the two levers 8 and 20 is maintained by limit switches in the usual way. The control elements for the insertion of the clip are arranged on the mounting plate 32 which is screwed on the casing 17. The piston and cylinder arrangement 33 actuates the displaceably fixed plate 39 by means of the angle lever 38 which is hinged in the yoke 34 and pivoted in the bearing 36. Plate 39 is directed by the strips 40 and 41. The clip holder 9 is firmly connected with the plate 39 which also carries the control means of the hammer 10. The piston and cylinder arrangement 44 effects that the hammer 10 by means of the yoke 45 and the angle lever 46 is swung to the left over the clip holder 9. The hammer 10 and the bolt 48 are not firmly connected with the angle lever 46 but the bolt 48 with the hammer 10 is displaceable lengthwise in the angle lever 46 against the tension of the spring 47. The bolt 48 carrying the hammer 10 is shaped squarely in order to prevent it from turning round. The travel of the plate 39 and consequently of the clip holder 9 between the guides 40 and 41 is limited in the usual way by limit switches 49 and 50. The sweep of the hammer 10 is a function of the maximum path of the piston and cylinder arrangement 44.

Figure 2:
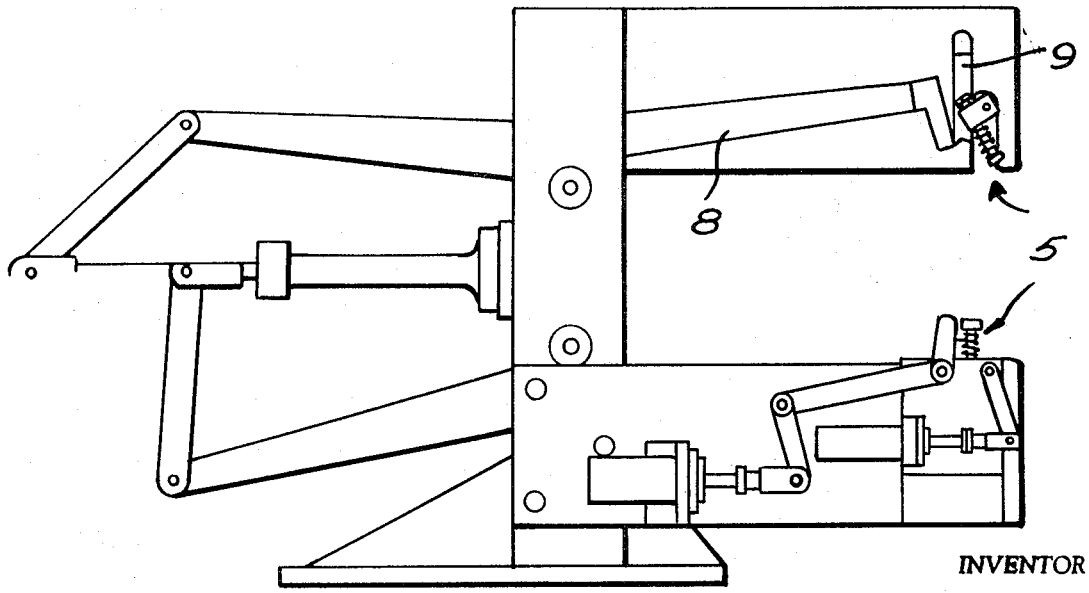
FIG. 2 is a side view of a correction device according to the invention.
Figure 3:
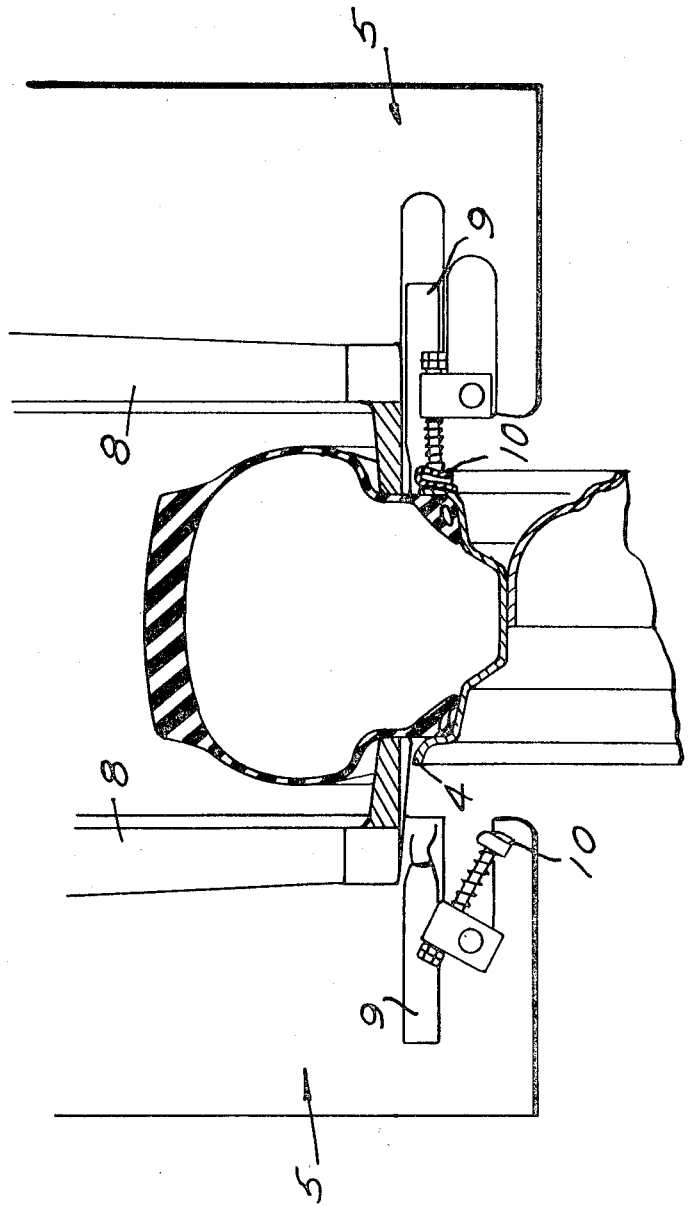
FIG. 3 is a representation of the operation of inserting the holding clip.
Figure 5:
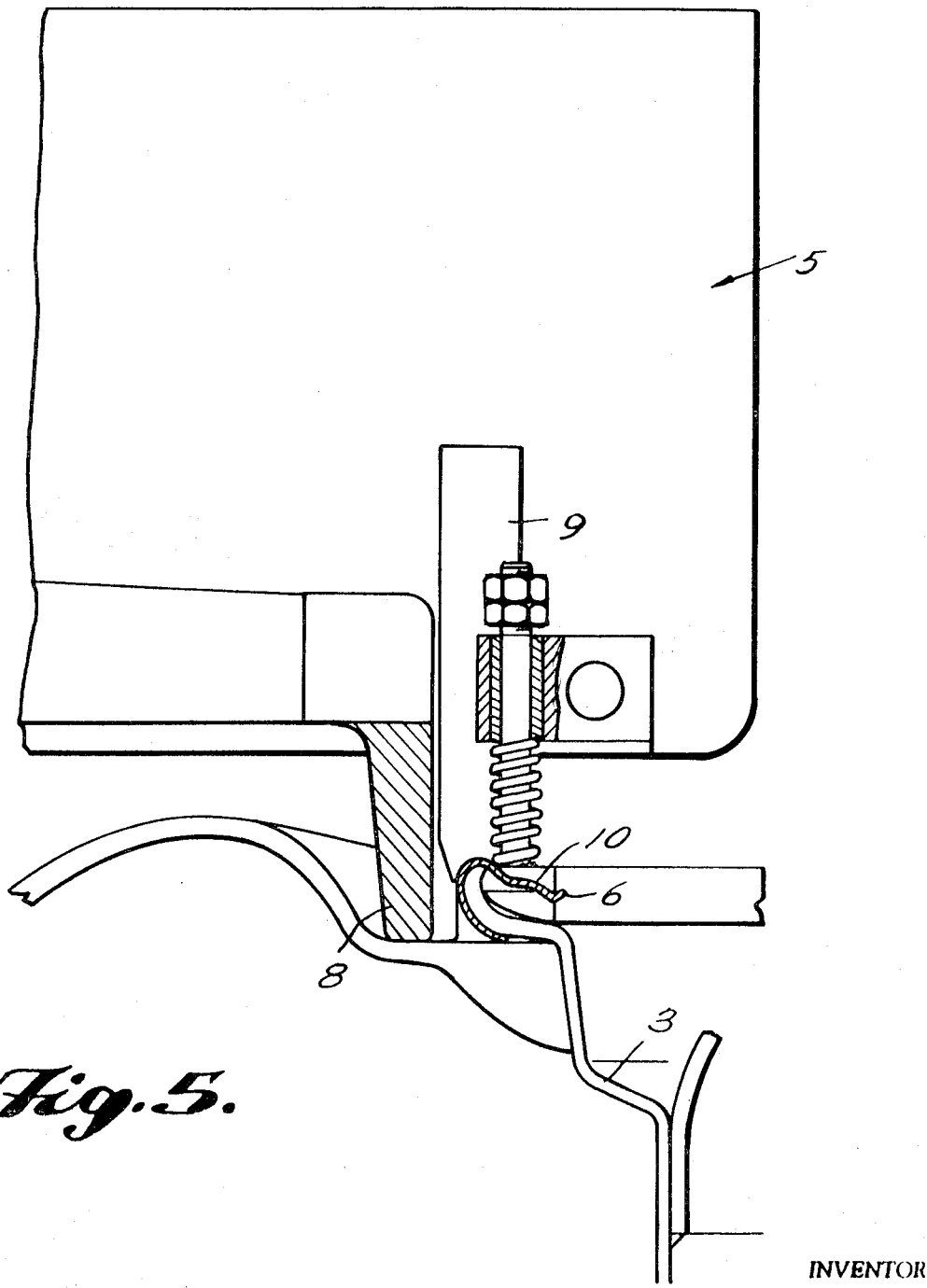

Following is a description of the clip inserting operation with reference to FIGS. 1, 2 and 3. It is assumed that the light point for example in the lower plane of the wheel to be balanced is turned to the inserting plane, in other words the light point in the lower wheel side is exactly over the clip holder 9. The operation of the piston and cylinder arrangement 33 produces an upward movement of the plate 39 with the clip holder 9 toward the rim flanges. The holding clip 6 is fed from an aligning drum 11 over the chutes 50 and 49, respectively, and a distributor 51 to the clip holder 9 before being applied.

The holding clip 6 is held on the clip holder 9 by means of the therein embedded magnets 42 and 43, respectively. The moment the holding clip 6 is slipped over the rim flange 4, the hammer 10 is moved toward the rim flange under the action of the piston and cylinder arrangement 44 and the angle lever 46. The hammer 10 having the form of a balance weight will fit therefore in the rim flange just as a balance weight, and adjust the holding clip so as to ensure a perfect seat of the balance weight subsequently applied. As soon as the hammer 10 has adjusted the holding clip 6, the levers 8 and 20 release the tire again and the hammer 10 is withdrawn. Plate 39 will return to its normal position downward. Application of the holding clip in the upper wheel side takes place similarly.

What is claimed is:

1. In a method which includes mounting a motor vehicle wheel (comprising a tire having two axially spaced tire beads pressed against two respective rim flanges of a wheel rim) horizontally for rotation about the vertical longitudinal axis of the wheel, rotating said wheel about said axis at a predetermined speed and determining the amount and angular position of the weight required at one rim flange to, together with a balance weight holding clip, balance said wheel in the radial correction plane passing through said one rim flange, the improvement which comprises the successive steps of:
   while said wheel remains mounted,
   (a) rotating the location of said position to a holding clip inserting station;
   (b) forcing the respective tire bead away from said one rim flange at said location;
   (c) pushing a holding clip onto said one rim flange at said location so that a first portion thereof lies between said tire bead and said one rim flange and a second portion thereof overlies the exterior of said one rim flange;
   (d) discontinuing said forcing, thereby allowing said respective tire bead to grip said holding clip against said one rim flange; and, thereafter, clipping a balance weight of said required amount to said wheel via said holding clip;
   said one rim flange being the lower of said two respective rim flanges and further comprising the steps of:
   no later than concurrently with step (c), inserting a balance weight simulator between said holding clip second portion and said one rim flange and into contact with both said holding clip second portion and the exterior of said one rim flange for preventing tilting misorientation of that holding clip during the period of distortion of the respective tire bead; and
   following step (d), prior to clipping of said balance weight, removing said balance weight simulator from between said holding clip second portion and said one rim flange.

2. In a method which includes mounting a motor vehicle wheel (comprising a tire having two axially spaced tire beads pressed against two respective rim flanges of a wheel rim) horizontally for rotation about the verical longitudinal axis of the wheel, rotating said wheel about said axis at a predetermined speed and determining the amount and angular position of the weight required at one rim flange to, together with a balance weight holding clip, balance said wheel in the radial correction plane passing through said one rim flange, rotating said wheel about said axis and determining the amount and angular position of the weight required at the other rim flange to, together with a balance weight holding clip, balance said wheel in the radial correction plane passing through said other rim flange, the improvement which comprises the successive steps of:
   while said wheel remains mounted,
   (a) rotating the location of one of said positions to a holding clip inserting station;
   (b) forcing the respective tire bead away from said one rim flange at said location;
   (c) pushing a first holding clip onto said one rim flange at said location so that a first portion thereof lies between said tire bead and said one rim flange and a second portion thereof overlies the exterior of said one rim flange;

(d) discontinuing said forcing, thereby allowing said respective tire bead to grip said first holding clip against said one rim flange; and, thereafter, clipping a balance weight of said required amount to said wheel via said first holding clip; and which comprises the successive steps of while said wheel remains mounted, (a) rotating the location of the other of said positions to a holding clip inserting station;

(b) forcing the respective tire bead away from said other rim flange at said location;

(c) pushing a second holding clip onto said other rim flange at said location so that a first portion thereof lies between said tire bead and said other rim flange and a second portion thereof overlies the exterior of said other rim flange;

(d) discontinuing said forcing, thereby allowing said respective tire bead to grip said second holding clip against said other rim flange; and, thereafter, clipping a balance weight of said required amount to said wheel via said second holding clip; said one rim flange being the lower of said two respective rim flanges and further comprising the steps of: no later than concurrently with step (c), inserting a balance weight simulator between said holding clip second portion and said one rim flange and into contact with both said holding clip second portion and the exterior of said one rim flange; and following step (d), prior to clipping of said balance weight, removing said balance weight simulator from between said holding clip second portion and said one rim flange.

References Cited

UNITED STATES PATENTS

| | | | |
|---|---|---|---|
| 2,029,561 | 2/1936 | Du Sang | 301—5 B |
| 2,049,918 | 8/1936 | Marsh | 301—5 B |
| 2,122,064 | 6/1938 | Hume | 301—5 BA |
| 2,137,415 | 11/1938 | Rubsam | 301—5 B |
| 2,173,321 | 9/1939 | Hatch | 301—5 B |
| 2,176,269 | 10/1939 | Morse | 301—5 B |
| 2,202,129 | 5/1940 | Turner | 301—5 B |
| 2,218,410 | 10/1940 | Weaver | 301—5 B |
| 2,231,948 | 2/1941 | Rickey | 301—5 B |
| 2,585,140 | 2/1952 | Lencki | 301—5 B |
| 2,801,883 | 8/1957 | Householder | 301—5 BA |

JOHN F. CAMPBELL, Primary Examiner

D. P. ROONEY, Assistant Examiner

U.S. Cl. X.R.

73—487; 301—5, 5 BA